Patented Nov. 30, 1937

2,101,012

UNITED STATES PATENT OFFICE 2,101,012

CLEANING OF FILTER SURFACES

Hoyt A. Pond and Elvis E. Perry, Port Arthur, Tex., assignors to The Texas Company, New York, N. Y., a corporation of Delaware No Drawing. Application May 11, 1937, Serial No. 142,068

7 Claims. (Cl. 210—62)

This invention relates to the cleaning of filtering surfaces and, more particularly, to the cleaning of the metallic cloth and metallic screens used in the filtration of tars.

More specifically, our invention relates to the cleaning of the metallic filtering surfaces which are employed for removing solids, such as coke, carbon, lime, and other impurities from tars and related high viscosity residues obtained in the treating of petroleum and particularly as by-products in the cracking of petroleum hydrocarbon oils.

Our invention consists in first subjecting the filtering surfaces from which the filter cake has been removed to the action of a hot petroleum hydrocarbon oil, treating the filtering surfaces with a hot aqueous solution of caustic alkali of a particular concentration, then treating with steam and finally washing with hot water.

In filtering tars and petroleum residues, it is customary to employ a filter such as the Kelly filter, which consists of a closed chamber within which are positioned a plurality of hollow filter leaves. These filter leaves consist of a framework covered with a metallic screen or metallic cloth. In using a filter of this type the hot tar is delivered into the filter chamber, fitting the same so that the filter leaves are immersed in the tar which is forced by pressure through the metallic cloth or screen into the interior of the various filter leaves, and then out of the filter leaves through outlets connecting with the interior of the filter leaves.

It is customary to coat the filter leaves with a filter-aid material, such as ground asbestos, diatomaceous earth or the like. This precoating operation, as it is commonly termed in the industry, is effected by circulating through the filter a suspension of the filter-aid material in a suitable carrying liquid which may be any one of the normally fluid hydrocarbon oils. When the leaves have been properly precoated with filter-aid material the circulation of the suspension of filter-aid material in oil is stopped and the tar or other viscous material to be filtered is then circulated through the filter.

After a varying length of time, dependent upon the types of tars and petroleum residues being filtered, as well as upon the type of impurities being filtered out of such materials, it becomes increasingly more difficult to force the tar to be filtered through the filter leaves. This is due to the accumulation of solids on the precoated surfaces, as well as the deposition of tarry materials directly upon the metallic screen or cloth. When this stage of the operation is reached circulation of the tar to be filtered through the filter is stopped and steam is passed through the filter until the several filter cakes are satisfactorily dried. The filter is then opened and the filter cakes adhering to the filter leaves are removed. Usually such filter leaves cannot be placed back in service because the interstices between the metallic wires composing the cloth or screen have become plugged with a tarry, gummy material. Our invention contemplates the cleaning of such filter leaves.

Up to the time of our invention it was impossible to remove substantially all of the tarry, gummy materials adhering to filtering surfaces used for the filtration of tars and petroleum residues. Various solvents were tried but without any substantial success. The most effective method was by cleaning the several leaves manually by scraping, brushing, buffing and even burning. These methods were extremely laborius and in all cases subjected the screens and cloths to considerable wear.

The method of cleaning which we have discovered avoids the foregoing disadvantages since it removes with great rapidity substantially all of the tarry materials impregnating the screens which have been used in the filtration of tars, and does not subject the filtering surfaces to undue wear or deterioration.

We have discovered that by first treating the filtering surfaces with a hot gas oil or a hot hydrocarbon oil having substantially the solvent properties of gas oil, and then treating the same with a hot caustic soda solution having a concentration in the range of from 40° to 50° Baumé, it is possible to remove substantially all of the impurities adhering to the filtering surfaces. Our experimental work indicates that the hydrocarbon oil solvent and the caustic soda solution co-operate when employed in the given sequence, since the use of either alone or in a reverse order does not result in the desired effect.

We believe that the reason for this lies in the fact that the gas oil or other hydrocarbon oil solvent dissolves that portion of the gums and tars which normally inhibit the solvent action of the caustic soda solution. This is borne out by the fact that caustic solutions having gravities in the neighborhood of 35° Baumé or lower display substantially no solvent effect and are useless in the practice of our invention.

In practicing our invention the cleaning of the filter leaves is started while the filter is still hot from the filtering operation. After the filter cakes have been dumped, gas oil is circulated through the filter, the temperature being above 300° F. and normally about 400° F. The circulation of the gas oil is continued for a short length of time, usually for from 15 to 20 minutes, during which time the gas oil dissolves a considerable portion of the tarry impurities present in the filtering surfaces.

After the leaves have been treated with gas oil for the required length of time the filter is opened and the leaves are removed for the next step in the cleaning operation, which involves subjecting the leaves to the action of a hot solution of caustic soda having a concentration of between 40° and 50° Baumé. Although we prefer to use the caustic soda solution at a temperature of 180° F. we do not intend to limit ourselves to this temperature but contemplate the use of temperatures ranging from 150° F. to the boiling point of the particular caustic soda solution being used. Before the leaves are immersed in the caustic soda solution they may be cleaned of any loosely adhering particles of clay by scraping or brushing, and the leaves are then allowed to soak in the caustic soda solution for an extended period of time, usually from 12 to 36 hours or longer, the actual length of time depending upon the quantity of impurities present and the tenacity with which they adhere to the filtering surfaces.

After the leaves have been acted upon by the caustic soda for the requisite length of time the leaves are removed from the caustic soda bath and are blown with steam in order to wash the loosened impurities out of the interstices in the wire mesh or screen composing the filter surfaces. After this the leaves are washed with water to remove therefrom any traces of caustic clinging thereto, after which they are ready for use.

Although we have described the use of caustic soda solutions for the purpose of cleaning the filter leaves we also contemplate the use of aqueous solutions of caustic potash and in fact any aqueous solutions of any alkali metal hydroxide having substantially the solvent characteristics of caustic soda, the only limitation which we impose being that the solutions be used at concentrations at which they behave like caustic soda solutions of between 40° and 50° Baumé gravity.

Obviously many modifications and variations of the invention as hereinbefore set forth may be made without departing from the spirit and scope thereof, and therefore only such limitations should be imposed as are indicated in the appended claims.

We claim:

1. The method of cleaning filter leaves used in the filtration of petroleum tars, which comprises subjecting the leaves to the action of a hot petroleum hydrocarbon tar solvent, withdrawing the leaves from the action of the hot solvent, then subjecting the leaves to the action of a hot concentrated water solution of a caustic alkali, withdrawing the leaves from the action of this solution, passing steam through the leaves, and then washing the leaves with hot water.

2. The method of cleaning filter leaves used in the filtration of petroleum tars, which comprises circulating a hot petroleum hydrocarbon tar solvent through the leaves whereby the leaves are partly cleaned, then immersing the partly cleaned leaves in a hot concentrated water solution of sodium hydroxide, withdrawing the leaves from the action of the sodium hydroxide solution, then passing steam through the leaves, and thereafter washing with hot water.

3. The method of cleaning filter leaves used in the filtration of petroleum residues, which comprises circulating through the filter leaves hot gas oil until the bulk of the adhering impurities are removed, then subjecting the leaves to the action of a hot concentrated sodium hydroxide solution for a prolonged period of time whereby further quantities of the impurities are removed, then removing the remaining impurities by passing steam through the leaves and washing with hot water.

4. The method of cleaning filter leaves used in the filtration of petroleum residues, which comprises circulating through the leaves a gas oil at a temperature of above 250° F. whereby the bulk of the impurities adhering to the leaves is removed, then subjecting the leaves to the action of a hot solution of sodium hydroxide having a concentration of about 40° Baumé or higher for a prolonged period of time, then withdrawing the leaves from the action of the sodium hydroxide solution, subjecting the leaves to the action of steam, and then washing the leaves with hot water.

5. In the cleaning of filter leaves used in the filtration of petroleum residues the sequence of steps, including circulating hot gas oil through the filter leaves, soaking the leaves in a solution of sodium hydroxide having a concentration of about 40° Baumé or higher, blowing with steam and then washing with hot water.

6. The method of cleaning filter leaves used in the filtration of petroleum residues, which comprises circulating hot gas oil through the filter leaves while in situ within the hot filter, discontinuing the circulation of the hot gas oil, withdrawing the filter leaves from the filter, removing loosely adhering impurities by scraping, immersing the filter leaves in a hot solution of sodium hydroxide having a concentration of about 40° Baumé or higher for a prolonged period of time, withdrawing the leaves from the action of the hot sodium hydroxide solution, blowing the leaves with steam and then washing with hot water.

7. The method of cleaning filter leaves used in the filtration of petroleum residues, which comprises circulating hot gas oil through the filter leaves while in situ within the hot filter, discontinuing the circulation of the hot gas oil, withdrawing the filter leaves from the filter, removing loosely adhering impurities by scraping, immersing the filter leaves for a prolonged period of time in a solution of sodium hydroxide having a concentration of between 40° Baumé and 50° Baumé and a temperature in the neighborhood of 180° F., withdrawing the leaves from the action of the hot sodium hydroxide solution, blowing the leaves with steam and then washing with hot water.

HOYT A. POND.
ELVIS E. PERRY.